United States Patent [19]

Bayley

[11] Patent Number: 4,580,837

[45] Date of Patent: Apr. 8, 1986

[54] VEHICLE SEAT

[75] Inventor: William T. Bayley, Bloomfield Hills, Mich.

[73] Assignee: Car Tec Inc., Troy, Mich.

[21] Appl. No.: 603,845

[22] Filed: Apr. 25, 1984

[51] Int. Cl.⁴ ............................................. B60N 1/02
[52] U.S. Cl. .................................... 297/355; 297/346; 297/378; 297/452; 297/284
[58] Field of Search ............... 297/284, 346, 452, 355, 297/354, 378, 379

[56] References Cited

U.S. PATENT DOCUMENTS

| | | | |
|---|---|---|---|
| 3,192,541 | 7/1965 | Moore | 297/284 X |
| 3,288,525 | 11/1966 | Cerf | 297/284 |
| 3,363,941 | 1/1968 | Wierwille | 297/284 |
| 3,635,524 | 1/1972 | Faust | 297/284 |
| 3,700,203 | 10/1972 | Adams | 297/346 X |
| 3,774,968 | 11/1973 | Fenton | 297/452 |
| 3,778,104 | 12/1973 | Kusters | 297/284 X |
| 3,795,021 | 3/1974 | Moniot | 297/284 X |
| 3,844,614 | 10/1974 | Babbs | 297/284 |
| 4,139,235 | 2/1979 | Elbert | 297/284 |
| 4,401,343 | 8/1983 | Schmidt | 297/452 X |
| 4,470,632 | 9/1984 | Babbs | 297/346 X |
| 4,502,728 | 3/1985 | Sheldon et al. | 297/284 |

FOREIGN PATENT DOCUMENTS 2262594  7/1974  Fed. Rep. of Germany ...... 297/284

Primary Examiner—William E. Lyddane
Assistant Examiner—Laurie K. Cranmer
Attorney, Agent, or Firm—Gifford, Groh, VanOphem, Sheridan, Sprinkle & Dolgorukov

[57] ABSTRACT

The present invention provides a pedestal seat for a vehicle, such as a car, having a base comprising a base shell and a pair of elongated rails secured to the bottom of the base shell so that the rails are spaced apart and parallel to each other. These rails are, in turn, longitudinally slidably mounted to tracks secured to the vehicle floor. A pair of hinges are directly secured to the rear ends of the rails while a back plate is pivotally mounted to the hinges. A back shell is attached to the back plate and both the base shell and back shell are subsequently covered by seat and back cushions, respectively, so that the hinges are hidden from view. Since the rails, hinges and back plate form the support structure for the seat, the base shell and back shell can be easily interchanged to facilitate styling changes. In addition, two or more bladders are variably inflatable to provide upper back and head support.

11 Claims, 7 Drawing Figures

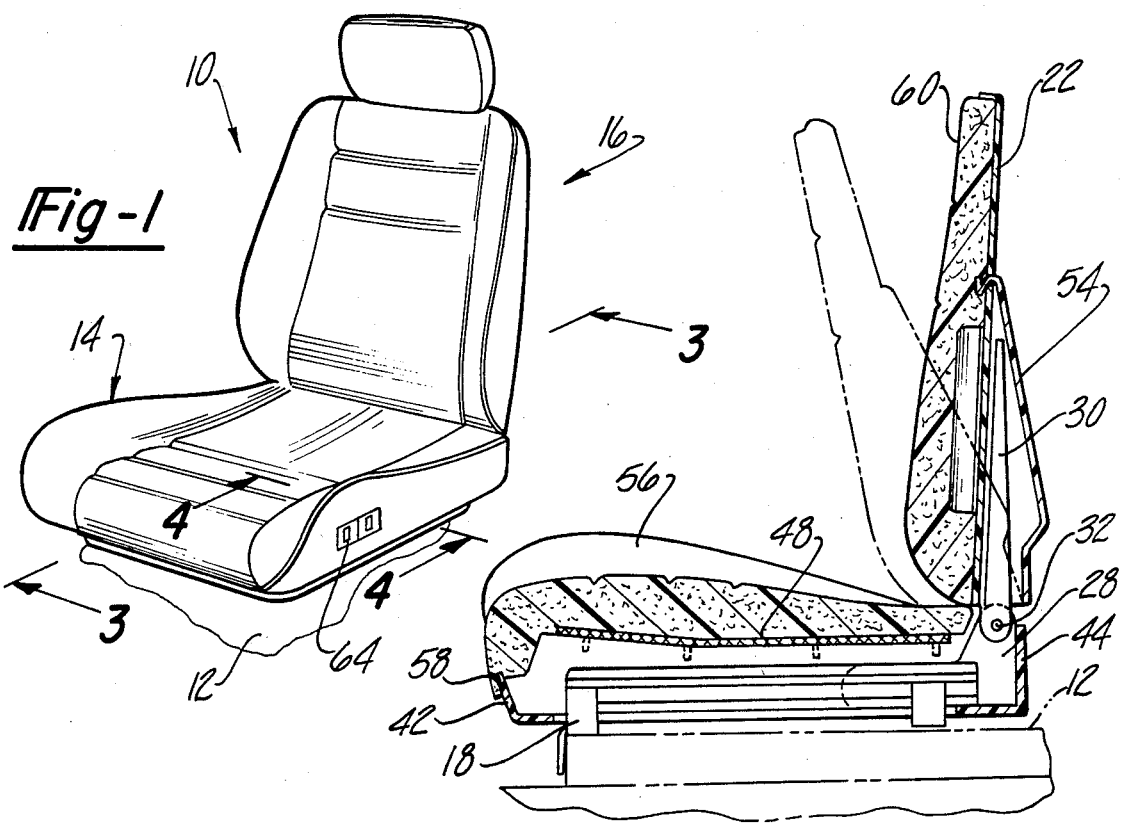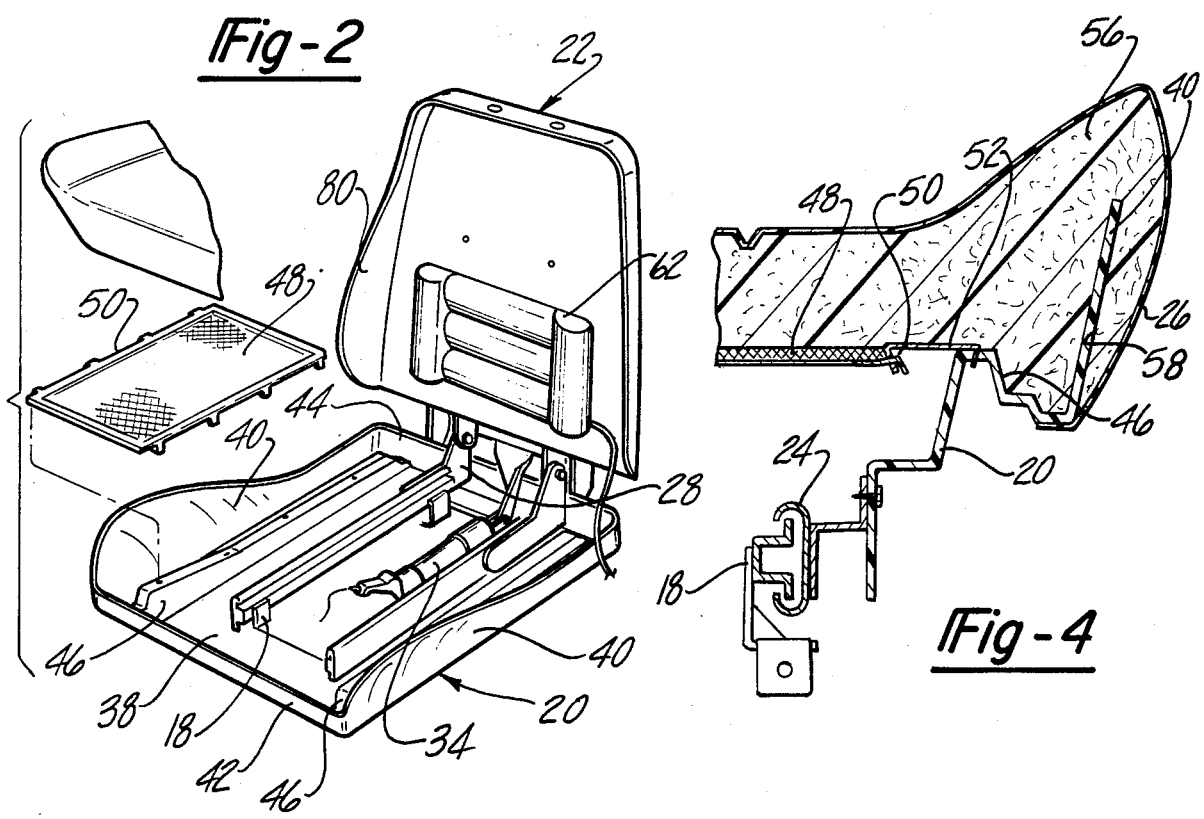

VEHICLE SEAT

BACKGROUND OF THE INVENTION

I. Field of the Invention

The present invention relates to vehicle seats and, more particularly, to a vehicle seat with hidden mechanism.

II. Description of the Prior Art

There are a number of previously known vehicle seats which utilize a pedestal design for securing the seat to the vehicle floor. These previously known pedestal seats comprise a base or seat portion on which a person sits. Usually, this seat base comprises a metal frame and is mounted to the vehicle floor by two or more rails which allow the longitudinal position of the seat relative to the vehicle to be adjusted by the user.

In addition, these previously known pedestal seats include a seat back also having a metal frame and which extends upwardly from the rear of the base. The seat back is typically pivotally mounted to the base so that the seat back can recline with respect to the base. Conventional locking means allow the seat back to be locked to the seat base at a plurality of angular positions.

Both the seat back and the seat base are covered by cushions constructed of foam or the like.

One disadvantage of these previously known pedestal vehicle seats is that the hinges between the base and the seat back are positioned on opposite sides of the seat between the base and the seat back and thus are exposed to the interior of the passenger compartment. Since these hinges are exposed to the passenger compartment, the hinges must be covered and/or ornamentally constructed to both provide a pleasing appearance for the seat as well as to protect the user and his clothes from injury during operation of the hinge. The necessity of covering or ornamenting the hinge, however, is disadvantageously expensive both in material and labor costs.

A still further disadvantage of these previously known vehicle seats is that seat and back frames are expensive and heavy in construction since these frames are an integral part of the seat structure and must be designed to withstand all seat loading during testing and use. Consequently, the base and back frames are not easily interchangable to provide alternate seating patterns and styling.

SUMMARY OF THE PRESENT INVENTION

The present invention provides a vehicle seat which overcomes all the above-mentioned disadvantages of the previously known vehicle seat.

In brief, the vehicle seat of the present invention comprises a pair of elongated tracks which are secured to the vehicle floor so that the tracks are spaced apart and parallel to each other. A base includes a pair of elongated rails which are slidably mounted to the tracks while conventional locking means lock the rails to the tracks at any desired position between a forward and retracted position.

The base further includes a base shell secured to the rails so that the base shell and rails move in unison with each other. Furthermore, the base shell can be dimensioned so that the sides of the base overlap both the rails and tracks and conceals the rails and tracks from view. The base shell is preferably constructed of lightweight plastic or a tube type frame.

A pair of hinge plates are secured to the rear end of the rails while a back support plate is pivotally secured to the hinge plates. A conventional recline mechanism is operatively connected with the back plate in order to lock the back support plate to the rails at any desired angular position with respect to the base.

A back shell constructed of lightweight plastic or a tube type frame is attached to the back support plate and a back cushion is then secured to the rear frame. An inflatable lumbar support is preferably positioned in between the back shell and the back cushion to provide additional lumbar support as desired by the user. In addition, a plastic cover is mounted to the back shell which encloses the back support plate in between the cover and the back shell. However, the back shell and back support plate can be integrated as one as required.

Similarly, a seat cushion is secured to and supported on top of the base shell.

The vehicle seat of the present invention is thus advantageous in several different respects. First, the hinge connection between the base and the back support plate is completely hidden rather than exposed to the interior of the passenger compartment as in the previously known vehicle seats. This not only simplifies the structural design and prevents injury to the passenger and/or the passenger's clothing from the hinge but also allows the hinge to be inexpensively constructed since chrome plating, hinge covers and the like are no longer necessary.

A still further advantage of the present invention is that the base and back shells are preferably constructed of plastic or tube frame which reduces the overall weight of the seat.

The vehicle seat of the present invention further provides a very streamlined vehicle seat which enhances the overall appearance of the seat and allows more knee, leg and foot room for back seat passengers.

A stil further advantage of the present invention is that sbustantially all of the seat loading is transferred from the back plate, through the hinges and directly to the rails. Thus, since the base shell and back shell do not constitute a major portion of the structural integrity of the seat, they may be easily interchanged to accomodate styling changes without redesign of the structural or support components of the seat.

In the preferred form of the invention, the seat includes at least two vertically spaced inflatable bladders at the upper back, neck and/or head portion of the seat. The bladders are independently and variably inflatable by the passenger to obtain the desired upper back, neck and head support.

BRIEF DESCRIPTION OF THE DRAWING

A better understanding of the present invention will be had upon reference to the following detailed description, when read in conjunction with the accompanying drawing, wherein like reference characters refer to like parts throughout the several views and in which:

FIG. 1 is a perspective view illustrating a preferred embodiment of the present invention;

FIG. 2 is an exploded illustrating the preferred embodiment of the invention and with parts removed for clarity;

FIG. 3 is a sectional view taken substantially along 3—3 in FIG. 1;

FIG. 4 is a fragmentary sectional view taken substantially along line 4—4 and enlarged for clarity;

DETAILED DESCRIPTION OF THE PREFERRED EMBODIMENT OF THE INVENTION

Figure 7:
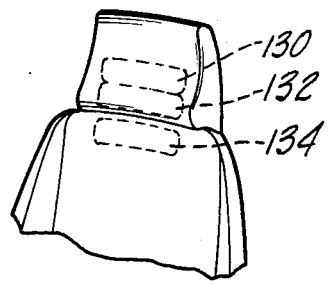
FIG. 7 is a view similar to FIG. 6 but showing a modification thereof.

With reference first to FIG. 1, a preferred embodiment of the vehicle seat 10 of the present invention is thereshown and is adapted to be secured to a floor 12 of a vehicle in a manner to be subsequently described in greater detail. The seat 10 includes both a base portion 14 as well as a back portion 16.

With reference now to FIGS. 2–4, a pair of elongated tracks 18 are secured to the floor 12 of the vehicle so that the tracks 18 are spaced apart and parallel to each other. These tracks 18 are preferably constructed of steel and are spaced apart from each other by a distance less than the width of the base portion 14.

The vehicle seat 10 includes both a base shell 20 and a back shell 22. Preferably the shells 20 and 22 are constructed of a lightweight synthetic material, such as plastic, although other materials may alternately be used. As best shown in FIG. 4, a pair of elongated rails 24 are secured to the base shell 20 at a position spaced inwardly from its sides 26 to longitudinally slidably mount the base shell 20 to the tracks 18. The rails 24 can be of any conventional construction and means (not shown) are provided along tracks 8 to selectively lock the rails 24 to the tracks 18 at any desired longitudinal position.

With reference now particularly to FIGS. 2 and 3, a hinge plate 28 is secured to the rear end of each rail 24. The hinge plates 28 are spaced apart and parallel to each other and move in unison with the movement of the seat 10 along the tracks 18. A back support plate 30, preferably constructed of metal, is pivotally secured by a hinge pin 32 to each hinge plate 28 to permit the back portion 16 to pivot as shown in phantom line in FIG. 3. A conventional recline locking mechanism 34 (FIG. 2) allows the angular position of the back portion 16 to be releasably locked at the angular position desired by the user.

As best shown in FIG. 2, the base shell 20 includes a generally rectangular bottom 38 having upwardly extending side panels 40, front panel 42 and rear panel 44. As best shown in FIG. 3, the rear panel 44 extends upwardly behind the hinge plates 28 and thus conceal the hinge plates 28 from view. A longitudinally extending and upwardly protruding ridge 46 (FIG. 2) is formed adjacent each side panel 40.

Still referring to FIGS. 2–4, a panel 48 of stretch fabric having an outer frame or similar suspension system 50 is secured across and in between the ridges 46. Although any means can be used to secure the stretch fabric panel 48 to the bottom shell 20, preferably a plurality of horseshoe fasteners 52 extend between the panel frame 50 and holes formed in the ridges 46 as best shown in FIG. 4.

With reference now particularly to FIGS. 2 and 3, the back shell 22 is secured to the front of the back support plate 30 by conventional fasteners (not shown). A cover 54 is then attached to the back shell 22 by conventional means so that the back support plate 30 is enclosed in between the cover 54 and the back shell 22.

With reference now to FIGS. 3 and 4, a seat cushion 56 is positioned over and secured to the base shell 20 in any conventional fashion. Preferably, the cushion 56 includes receiving slots 58 (FIG. 4) along its sides and front end into which the side panels 40 and front panel 42 of the base shell 20 extend. With the seat cushion 56 secured to the bottom shell 20, the panel of stretch fabric 48 abuts against the central portion of the bottom of the seat cushion 56 as best shown in FIGS. 3 and 4.

Similarly, a back cushion 60 constructed of foam rubber or the like is secured to the back shell 22. Preferably, the back cushion 60 includes receiving slots along its sides and into which side panels 80 (FIG. 2) on the back shell 22 extend. An inflatable bladder or lumbar support 62 is preferably sandwiched in between the back cushion 60 and the back shell 22. A control 64 (FIG. 1) along the side of the seat cushion 56 allows the lumbar support 62 to be inflated or deflated to respectively increase or decrease the lumbar support as desired by the user.

Figure 5:
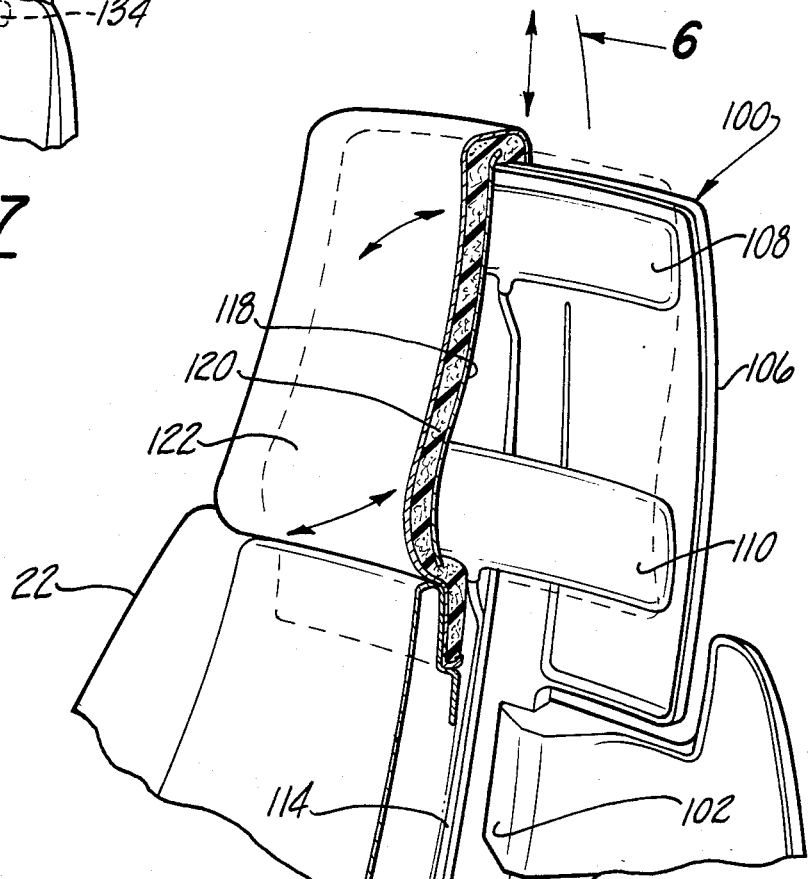
FIG. 5 is a fragmentary sectional view illustrating a portion of the preferred embodiment of the invention.
Figure 6:
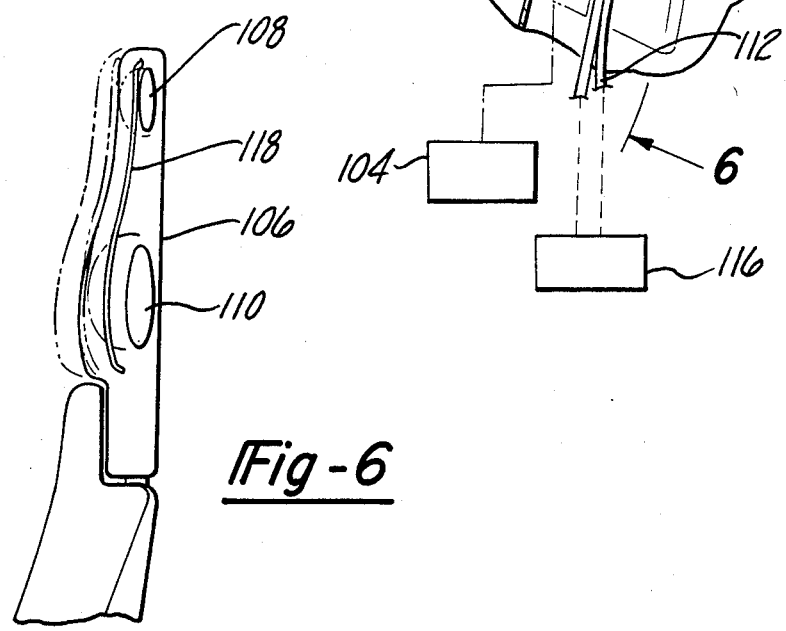
FIG. 6 is a fragmentary side view taken substantially along line 6—6 in FIG. 5.

With reference now to FIGS. 5 and 6 a further preferred embodiment of the present invention is thereshown in which a headrest 100 is vertically slidably mounted by a track 102 to the top of the seat back 22. Motor means 104, such as a pneumatic or electric motor, can be used to vertically displace the headrest 100 with respect to the seat back 22.

Alternatively, the headrest 100 can comprise the upper portion of the seat back 22.

The headrest 100 includes a headrest shell 106 in which two or more inflatable bladders 108 and 110 are mounted. These bladders 108 and 110 are connected by fluid lines 112 and 114, respectively, to a control means 116 which allows the passenger to independently and variably inflate or deflate the bladders 108 and 110.

Preferably, a rigid plate 118 is disposed across the front of the bladders 108 and 110 and this plate 118, in turn, is covered by a foam layer 120 and fabric 122. The plate 118 can laterally float with respect to the headrest shell 106.

With reference now particularly to FIG. 6, the inflation of the bladders 108 and 110 causes the plate 118 to shift laterally from the position shown in solid line and to the position shown in phantom line in order to vary the upper back, neck and head support for the passenger as desired. During deflation, the resiliency of the foam layer 120 returns the plate 118 to its retracted position. Furthermore, although the bladders 108 and 110 are illustrated in both their fully deflated and fully inflated positions in FIG. 6, it will be understood that the bladders 108 and 110 are both independently and variably inflatable.

With reference now to FIG. 7, a modification of the invention is thereshown in which three inflatable bladders 130, 132 and 134 are contained within the seat back to provide upper back, neck and head support. As before, the bladders 130, 132 and 134 are independently and variably inflatable. Unlike the embodiment of FIGS. 5 and 6, however, the bladders 130, 132, and 134 are vertically adjacent to each other so that the rigid plate 118 of the FIG. 5 embodiment is unnecessary.

A primary advantage of the vehicle seat of present invention is its provision of a pedestal vehicle seat in which the hinge mechanism 28, 30 and 32 between the seat in the back is completely concealed between the seat and back cushions and their respective shells or cover. Consequently, the previously known need for chrome plating and/or covering the hinge mechanism between the vehicle seat and its back is completely eliminated.

A still further advantage of the vehicle seat of the present invention is its provision of the lightweight base and back shells which not only reduce the weight of the seat but also provide a very streamline appearance for the seat.

Having described my invention, however, many modifications thereto will become apparent to those skilled in the art to which it pertains without deviation from the spirit of the invention as defined by the scope of the appended claims.

I claim:

1. A seat for a vehicle having a floor comprising:
   a base, constructed of a thin walled, rigid material and having a front, rear, two sides, top and bottom,
   a pair of elongated rails, means for securing said rails to the bottom of said base so that said rails are spaced apart and parallel to each other and spaced inwardly from the sides of said base, and wherein one end of each rail is positioned adjacent the rear of said base,
   means for slidably mounting said rails to the vehicle floor,
   a back plate,
   means for pivotally securing said back plate to said ends of said rails so that said back plate is pivotal about a substantially horizontal axis,
   a seat back assembly comprising a back shell having a width and constructed of a thin walled, rigid material and having two sides, a rear surface and a front surface, a cushion, means for attaching said cushion to said front surface of said back shell, and means for attaching said back plate to the back surface of said back shell wherein said back plate has a width substantially less than the width of the back shell whereby said back plate is spaced inwardly from said sides of said back shell,
   a seat cushion and means for securing said seat cushion to the top of said base shell, and
   a cover and means for securing said cover to the rear surface of said back shell so that said back plate is positioned between said cover and said back shell and so that said cover encloses said back plate.

2. The invention as defined in claim 1 and comprising a panel of elastic fabric secured to said base beneath said seat cushion.

3. The invention as defined in claim 1 and comprising an inflatable bladder, said bladder being sandwiched between said back cushion and said back plate.

4. The invention as defined in claim 1 wherein said base includes an upwardly extending panel along each side and wherein said seat cushion comprises a recess along each side and into which said panels are received.

5. The invention as defined in claim 1 wherein said base is constructed of a lightweight, synthetic material.

6. The invention as defined in claim 5 wherein said base material comprises plastic.

7. The invention as defined in claim 1 and comprising at least two inflatable bladders contained in an upper portion of said seat back, and means for independently and variably inflating said bladders.

8. The invention as defined in claim 7 wherein said bladders are vertically spaced from each other and further comprising a rigid plate positioned over said bladders.

9. The invention as defined in claim 7 wherein said upper portion of said seat back comprises a headrest and means for vertically slidably mounting said headrest to said seat back.

10. The invention as defined in claim 7 wherein said bladders are vertically closely adjacent each other.

11. The invention as defined in claim 10 and comprising at least three bladders contained in said upper portion of said seat back.

* * * * *